United States Patent
Liu et al.

(10) Patent No.: US 6,642,983 B2
(45) Date of Patent: Nov. 4, 2003

(54) MULTI-DOMAIN LIQUID CRYSTAL DISPLAY HAVING CONCAVE VIRTUAL BUMP STRUCTURES

(75) Inventors: Hong-Da Liu, Juipei (TW); Ching-Yih Chen, Miaoli (TW); Chi-Yi Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 346 days.

(21) Appl. No.: 09/754,961

(22) Filed: Jan. 5, 2001

(65) Prior Publication Data

US 2002/0089630 A1 Jul. 11, 2002

(51) Int. Cl.[7] .................................................. G02F 1/13
(52) U.S. Cl. ........................................ 349/129; 349/122
(58) Field of Search ................................ 349/129, 123, 349/139, 122, 113, 43

(56) References Cited

U.S. PATENT DOCUMENTS

| | | | |
|---|---|---|---|
| 4,861,143 A | * | 8/1989 | Yamazaki et al. ............. 349/85 |
| 5,907,380 A | | 5/1999 | Lien |
| 6,100,953 A | * | 8/2000 | Kim et al. .................... 349/129 |
| 6,356,335 B1 | * | 3/2002 | Kim et al. .................... 349/156 |
| 6,384,889 B1 | * | 5/2002 | Miyachi et al. ............... 349/143 |
| 6,449,025 B2 | * | 9/2002 | Lee ............................ 349/129 |

* cited by examiner

Primary Examiner—James Dudek

(57) ABSTRACT

A liquid crystal display has at least one concave structure formed on one of pixel and electrode layers in each pixel area. Between the electrode layer having concave structures and a substrate is a passivation layer that is dented by the concave structures. The concave structures form multiple domains for each pixel. One of the electrode layers may be formed with bump structures or openings combining with fringe field effect to provide pre-tilting of liquid crystals to enhance the effect of multiple domains. Each concave structure in a pixel area can have a different top view, cross-sectional view or three-dimensional structure. The concave structure can be formed by existing manufacturing process. One mask rubbing process or photo-aligned method may be used to align liquid crystals for the display in cooperation with the concave structures.

22 Claims, 10 Drawing Sheets

MULTI-DOMAIN LIQUID CRYSTAL DISPLAY HAVING CONCAVE VIRTUAL BUMP STRUCTURES

FIELD OF THE INVENTION

The present invention generally relates to a liquid crystal display, and more specifically to a multi-domain liquid crystal display having concave structures for achieving a wider viewing angle.

BACKGROUND OF THE INVENTION

In recent years, liquid crystal displays have become very popular in the market place. High quality liquid crystal displays require high resolution as well as a wide viewing angle. As a result, multi-domain liquid crystal displays have been developed to meet these requirements. In a multi-domain liquid crystal display, each pixel is divided into multiple domains to compensate for the asymmetry in optics to increase the viewing angle of the display.

Conventional multi-domain liquid crystal display technology can be divided into four categories. The first category uses transparent material to form protruded portions or bumps on a substrate to tilt vertically aligned liquid crystals along different directions when an electrical voltage is applied. Although this technique can pre-tilt liquid crystals without a mark rubbing or photo-aligned process, the alignment of liquid crystals is not very stable. It often requires other techniques to stabilize the multi-domain effect.

The second technique relies on slits or openings formed on an ITO electrode layer by etching in cooperation with fringe field effect to form multiple domains similar to the first technique. In practice, the technique can be combined with the first technique to achieve better results. If the second technique is used alone, chiral dopants have to be added to the liquid crystals and the response time is slower. The third technique uses mask rubbing which is a very complicated process with low yield. The fourth technique relies on a photo-aligned method that is still immature.

Forming multiple domains of the conventional multi-domain twisted nematic liquid crystal displays require several rubbing process steps during the manufacturing. Both anti-static charge and prevention of particle contamination are issues that have to be resolved. At present, multiple illumination steps are needed in the technique of the photo-aligned method for the formation of multiple domains.

FIG. 1 shows an example of the conventional multi-domain vertically aligned liquid crystal display with bump structures. The multiple domains in the display are enhanced by means of fringe filed effect and bump structures formed on both upper and lower substrates. As illustrated by the cross-sectional view in FIG. 1, the liquid crystal display 100 comprises a liquid crystal layer sandwiched between two substrates. The lower substrate 108 is a thin film transistor substrate with a pixel electrode layer 105 formed thereon. The upper substrate 109 is a color filter substrate with a common electrode layer 106 formed underneath. A pair of cross polarizers 101 and 102 are attached to the exterior surfaces of the display. Compensation films 103 and 104 are placed between the two polarizers. As can be seen from FIG. 1, a plurality of bump structures 111–117 are formed in the common and pixel electrode layers.

The conventional technique of using transparent material to form bump structures for vertically aligned multi-domain liquid crystal display has another drawback that the bump structures comprise parallel walls which result in disclination lines in the transparent areas of the display. Furthermore, bump structures have to be formed on both upper and lower substrates of the display to ensure that liquid crystals are aligned stably in the multiple domains and avoid the drifting of optical textures. The alignment accuracy, however, may be a problem.

SUMMARY OF THE INVENTION

This invention has been made to overcome the above mentioned drawbacks of a conventional multi-domain liquid crystal display. The primary object is to provide a concave structure in each pixel area to form multiple domains. The liquid crystal display of this invention comprises a first substrate, a pasivation layer and a pixel electrode layer formed above the first substrate, a second substrate having a common electrode layer formed underneath, and a liquid crystal layer between the two substrates. A plurality of concave structures are formed in the pixel electrode layer above the passivation layer.

Three other existing techniques are further combined with the concave structure of this invention to provide pre-tilting of liquid crystals in different directions to form multiple domains. These techniques include mask rubbing process, formation of bump structures or openings on an electrode layer in cooperation with fringe field effect. With the multiple domains, the disclination lines are confined in the domain boundary of a pixel area to enhance the contrast.

Accordingly, the structure of the liquid crystal display in this invention requires only one rubbing process or one photo-aligned method for crystal alignment to form multiple domains. The concave structure can be fabricated on the ITO electrode layer by the existing manufacturing process without using additional photo masks. Because the vertically aligned crystals result in a good dark state, the liquid crystal display has very high contrast. In addition, color dispersion is reduced because the liquid crystals are well compensated for the phase difference by the multiple domains.

In one embodiment of this invention, the concave structure is formed in a pixel electrode layer and one or more openings are formed on an electrode layer in a pixel area to combine with fringe field effect for enhancing the multiple domains. In another embodiment, surrounding wall bump structures are formed around the concave structure in a pixel area.

According to the invention, the concave structures can be formed on the pixel electrode layer or the common electrode layer. The openings or bump structures that are used in cooperation with the concave structures may also be formed on one of the electrodes layers. Each concave structure may have a plurality of concave structures. The concave structures may have different shapes.

The foregoing and other objects, features, aspects and advantages of the present invention will become better understood from a careful reading of a detailed description provided herein below with appropriate reference to the accompanying drawings.

DETAILED DESCRIPTION OF THE INVENTION

In the present invention, the principle of forming multiple domains is based on concave structures formed above a substrate in cooperation with mask rubbing, or bump structures fabricated or openings formed on electrode layers combined with fringe field effect to pre-tilt liquid crystals in a liquid crystal display.

Figure 1:
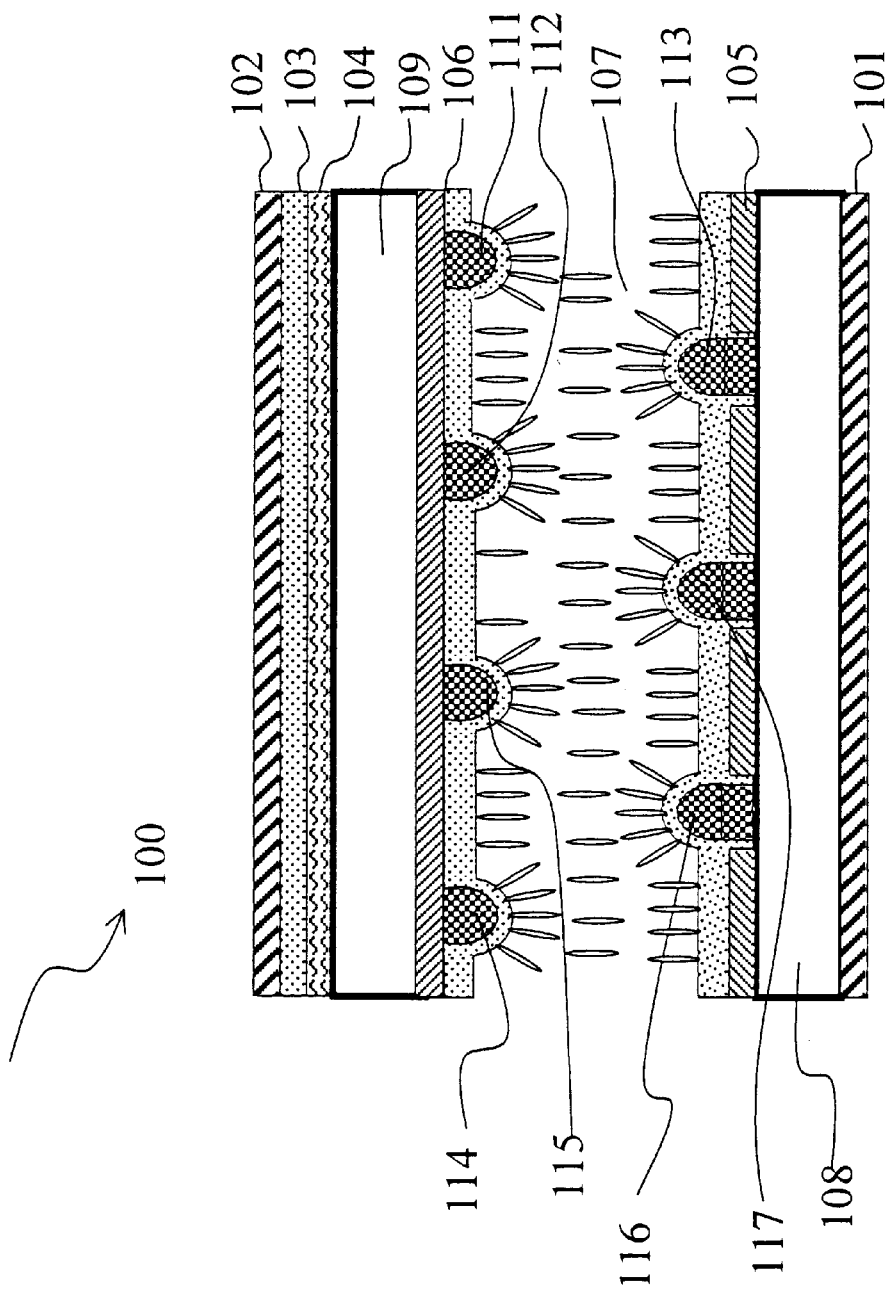
FIG. 1 is a cross-sectional view of a conventional multi-domain vertically aligned liquid crystal display with bump structures.
Figure 2:
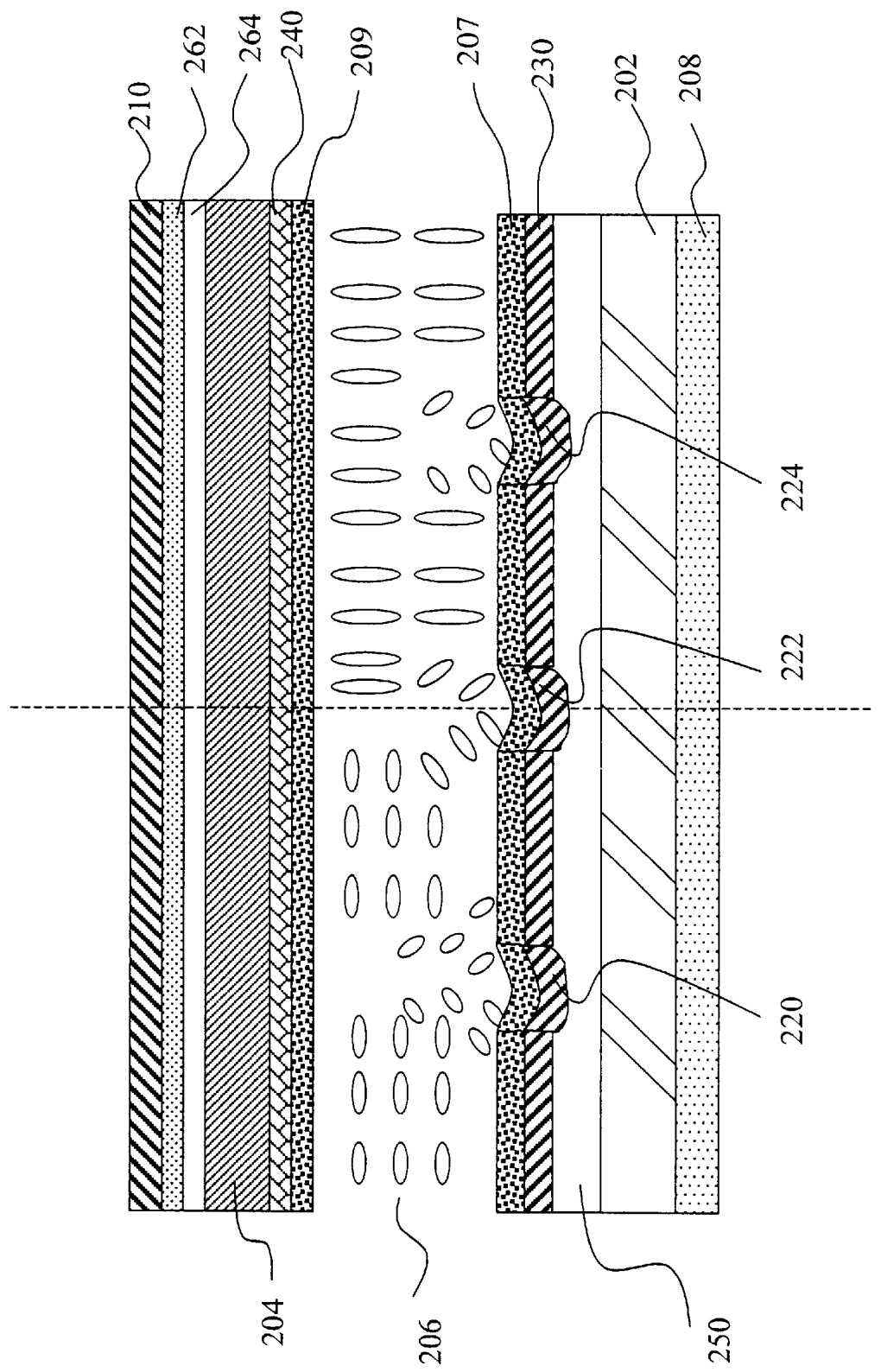
FIG. 2 shows the first embodiment of the cross-sectional views of the multi-domain liquid crystal display having concave structures according to the present invention.

A first embodiment of the liquid crystal display having concave structures is illustrated in FIG. 2. The cross-sectional views of the liquid crystal display in on and off states are shown side by side in the figure. In this embodiment, the concave structures are fabricated in the pixel electrode layer formed above a substrate. With reference to FIG. 2, the liquid crystal display comprises a first substrate 202, a second substrate 204 and a liquid crystal layer 206 embedded between the two substrates.

As shown in the first embodiment, the first substrate 202 is coated with a passivation layer 250. A pixel electrode layer 230 is formed above the passivation layer by a material such as ITO. Below the second substrate 204 is a common electrode layer 240. Two polarizers 208 and 210 are attached at the exterior surfaces of the liquid crystal display. Compensation films 262 and 264 are placed between the polarizer 210 and the common electrode layer 240. Between the liquid crystal layer 206 and the two electrode layers are the alignment films 207 and 209.

A plurality of concave structures 220, 222 and 224 are formed in the pixel electrode layer 230. Each concave structure is formed in the central area of a pixel. As can be seen from FIG. 2, the concave structures also result in concave surfaces on the passivation layer 250 in the pixel areas. Each concave structure creates an effect of a virtual-bump for the multi-domain partition of a pixel area. By means of the concave structures, liquid crystals are pre-tilted in different directions to form multiple domains.

Figure 3:
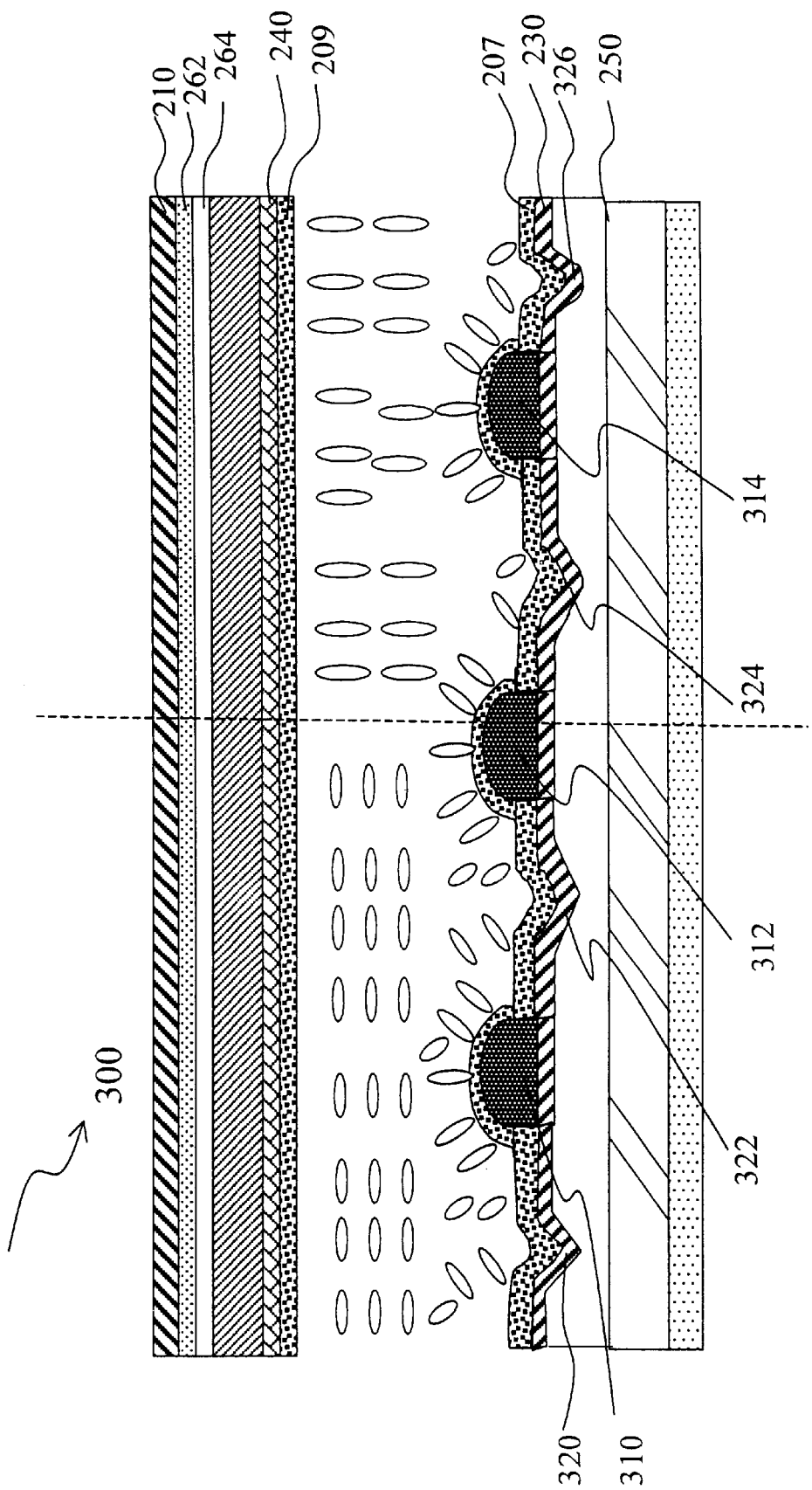
FIG. 3 shows the second embodiment of the cross-sectional views of the multi-domain liquid crystal display having concave structures and surrounding wall-bumps according to the present invention.

FIG. 3 shows a second embodiment according to the present invention. The cross-sectional views of the liquid crystal display in on and off states are again shown side by side. As shown in FIG. 3, the liquid crystal display 300 has a plurality of wall bumps 310, 312 and 314 each formed around the central area of a pixel above the pixel electrode layer 230. Concave structures 320, 322, 324 and 326 are formed between the wall bumps.

As can be seen from FIG. 3, the central area of each pixel has a concave structure that dents the alignment film 207, the pixel electrode layer 230 and the passivation layer 250 in the pixel area. In contrast to the first embodiment, the second embodiment relies on the combination of wall-bump structures and concave structures to pre-tilt liquid crystals in order to establish multiple domains.

Figure 4B:
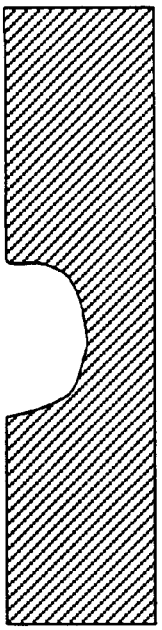
FIGS. 4(a)–4(d) show the cross-sectional views of four different concave structures in a pixel area according to the present invention.
Figure 4D:
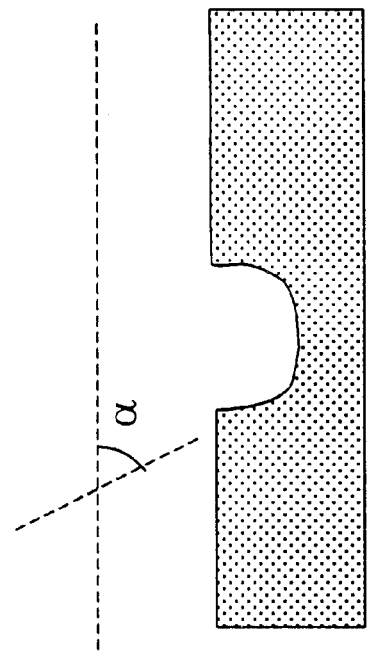
Figure 4A:
Figure 4C:
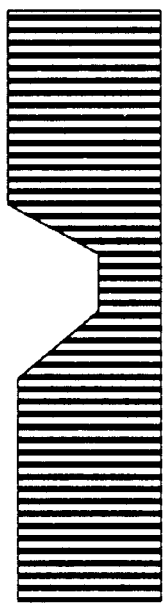

According to this invention, the concave structure in a pixel area can be formed by creating a single concave structure or a plurality of concave structures. The concave structures may have different shapes with different cross sectional views, different three-dimensional structures and different top views. FIGS. 4(a) to 4(d) illustrate the cross-sectional views of four different concave structures. FIG. 4(a) shows a triangular cross section. FIG. 4(c) shows a trapezoid cross section. FIGS. 4(b) and 4(d) show cross sections with arches. The average tilt angle of the side wall of a concave structure ranges from 3 to 70 degrees. The depth of a concave structure is generally less than 1 $\mu$m. The preferred depth is between 100 to 1000 angstroms. The width of the top cross section is approximately 0.5 to 20 $\mu$m.

Figure 5B:
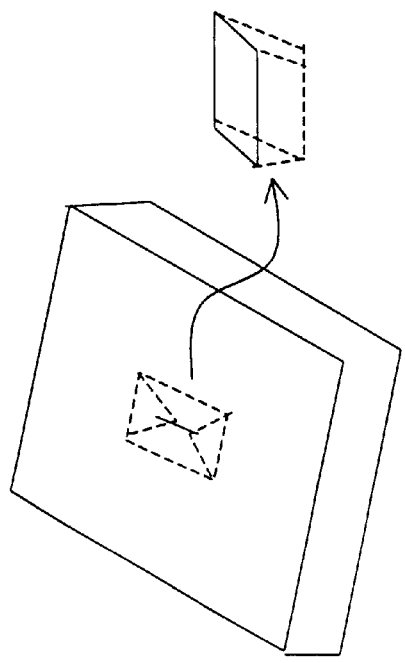
FIGS. 5(a)–5(e) show the three-dimensional views of five different concave structures in a pixel area according to the present invention.
Figure 5C:
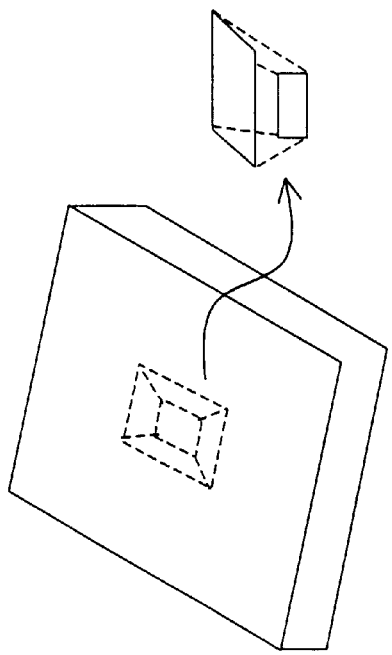
Figure 5A:
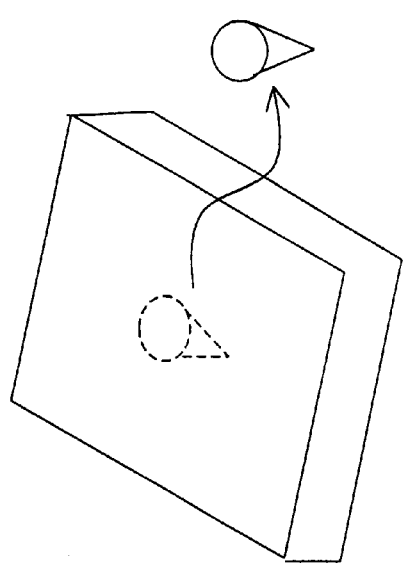
Figure 5E:
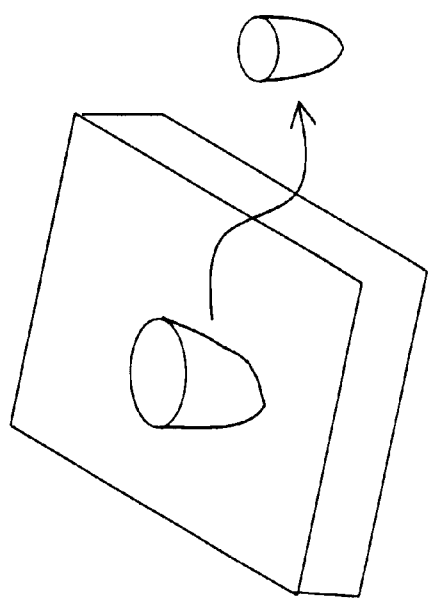
Figure 5D:
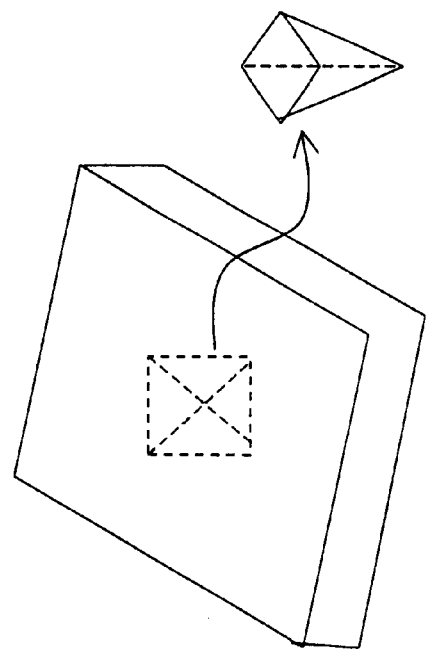
Figure 6B:
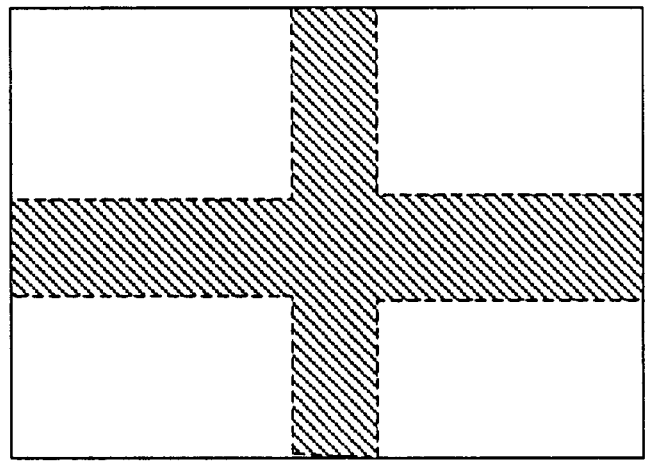
FIGS. 6(a)–6(d) show the top views of four different concave structures in a pixel area according to the present invention.
Figure 6A:
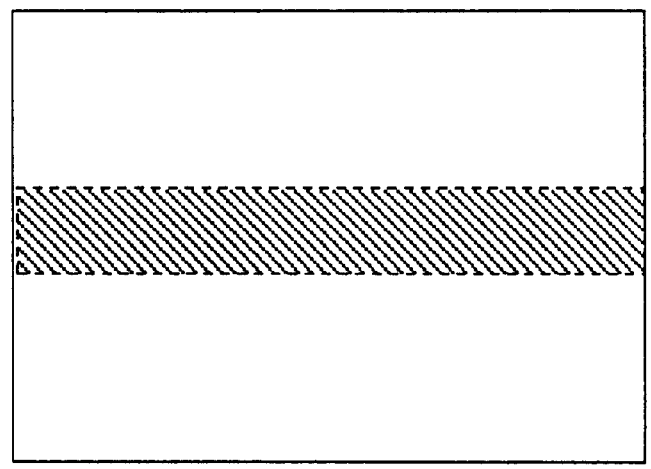
Figure 6D:
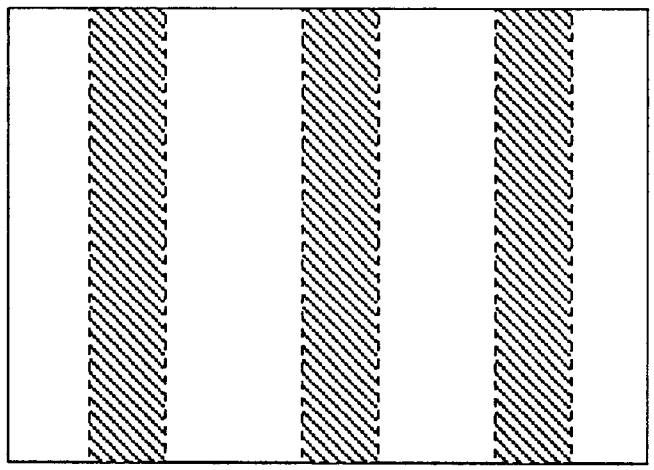
Figure 6C:
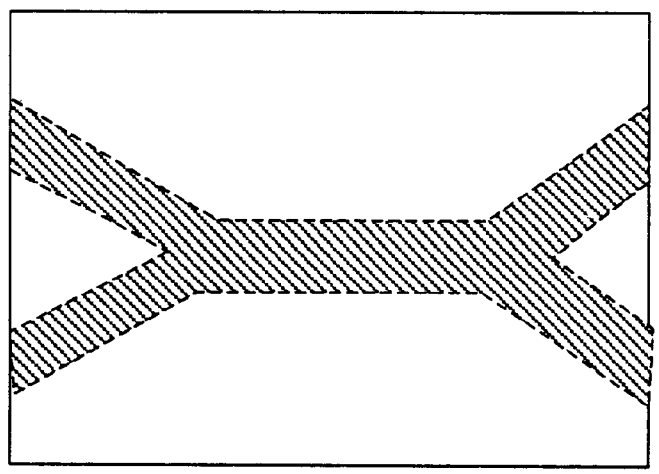

FIGS. 5(a) to 5(e) illustrate the three dimensional shapes of five different concave structures in a pixel area. The concave structure in FIG. 5(a) is a cone. In FIG. 5(b) is a wedge. FIG. 5(c) shows a three dimensional trapezoid. FIG. 5(d) is a pyramid in reverse and FIG. 5(e) is a cone with an oval shape. FIGS. 6(a) to 6(d) shows top views of other types of concave structures formed in a pixel area. The top views show a long vertical stripe, a cross, two Y's connected back to back, and three long horizontal stripes. Many other top views such as an X, a Y-inverse-Y shape, a T-inverse-T shape, or a V-inverse-V shape are also possible.

Figures 7A, 7B, 7C:
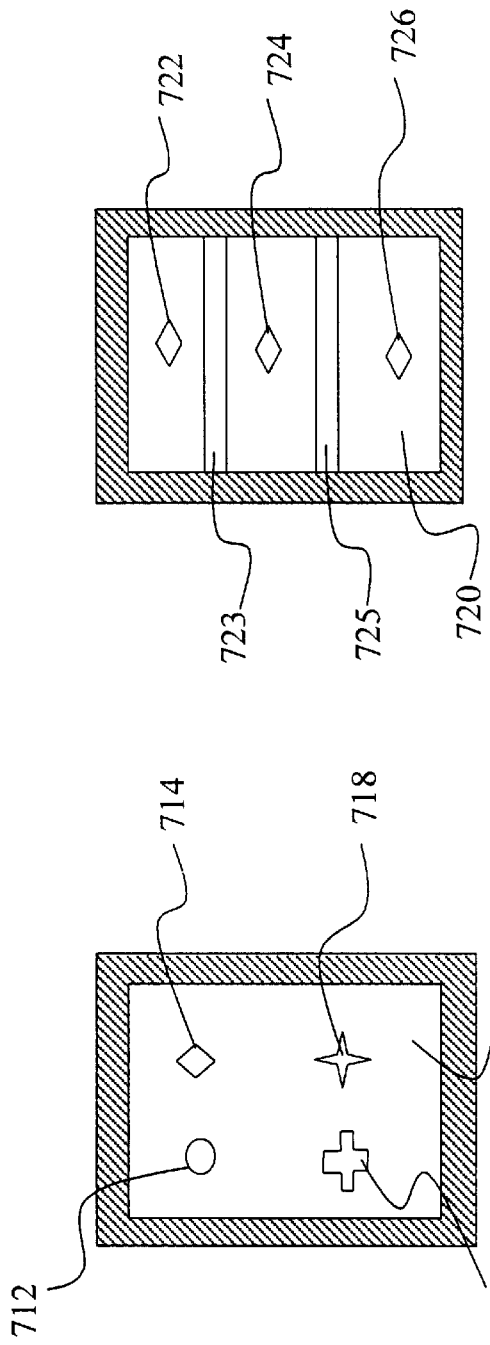
FIG. 7(a) shows a plurality of concave structures formed in a pixel area on one substrate of a liquid crystal display according to the present invention.
FIG. 7(b) shows a plurality of concave structures formed in a pixel area on one substrate and a plurality of wall-bumps formed on the other substrate of a liquid crystal display according to the present invention.
FIG. 7(c) shows a plurality of concave structures formed in a pixel area on one substrate and a plurality of openings formed on the pixel electrode of the other substrate of a liquid crystal display according to the present invention.

As mentioned above, a plurality of concave structures may also be formed in a pixel area. Each concave structure may have an identical or different structure. The concave structures can be arranged with different ways. FIGS. 7 shows a few examples of multiple concave structures in a pixel area. As can be seen in FIG. 7(a), there are four concave structures whose top views are a circle 712, a rhombus 714, a cross 716 and a star 718 respectively in a pixel area 710. In these examples, the concave structures are formed on the upper substrate, and the shaded area shows the bottom substrate.

According to this invention, the concave structures formed on one substrate can also work with wall bumps or openings formed on the other substrate to enhance the strength of pre-tilting liquid crystals. FIGS. 7(b) and 7(c) show two examples. As shown in FIG. 7(b), in the pixel area 720 the upper substrate of the liquid crystal display comprises concave structures 722, 724 and 726, and the lower substrate comprises elongated wall bump structures 723 and 725. In FIG. 7(c), concave structures including a circle, a rhombus, a cross and a star are formed on the upper substrate and three horizontal openings 731, 733 and 735 are formed on the electrode layer of the lower substrate in a pixel area. The openings formed on the electrode layer may also have various shapes, cross sections, three-dimensional structures and top views.

In the above-mentioned embodiments, the two substrates may be fabricated with thin-film transistors as the switching devices. The substrates may also comprise color filters. Alignment films of different types may be included in the display. In an embodiment of this invention, an alignment film for a horizontal direction is included in the upper substrate layers and an alignment film for a vertical direction is included in the lower substrate layers. The materials used in the alignment film include polyamic acid, polymide, PVC series and polysiloxane. If a photo aligned method is used in the liquid crystal display, the alignment in the horizontal or vertical direction can be accomplished by controlling the illumination in the process.

The formation of the concave structures in the liquid display can be accomplished on the upper electrode layer by using the existing manufacturing process without adding additional photo masks. For example, after the substrate formation and photoresist coating of the yellow light illumination process, the photoresist can be etched to a desired depth using multi-step exposure by means of light interference with one or more photo masks. A passivation layer is then over-coated to form the concave structures.

Accordingly, the liquid crystal display of this invention requires only one rubbing process or one photo aligned method to form multiple domains. The disclination line in a pixel area is confined within the border area of the multiple domains. Because of the internal compensation of liquid crystals by the multiple domains, color dispersion of the display is reduced. The alignment in the vertical direction also results in a good dark state and, hence, high contrast for the liquid crystal display.

Figure 8:
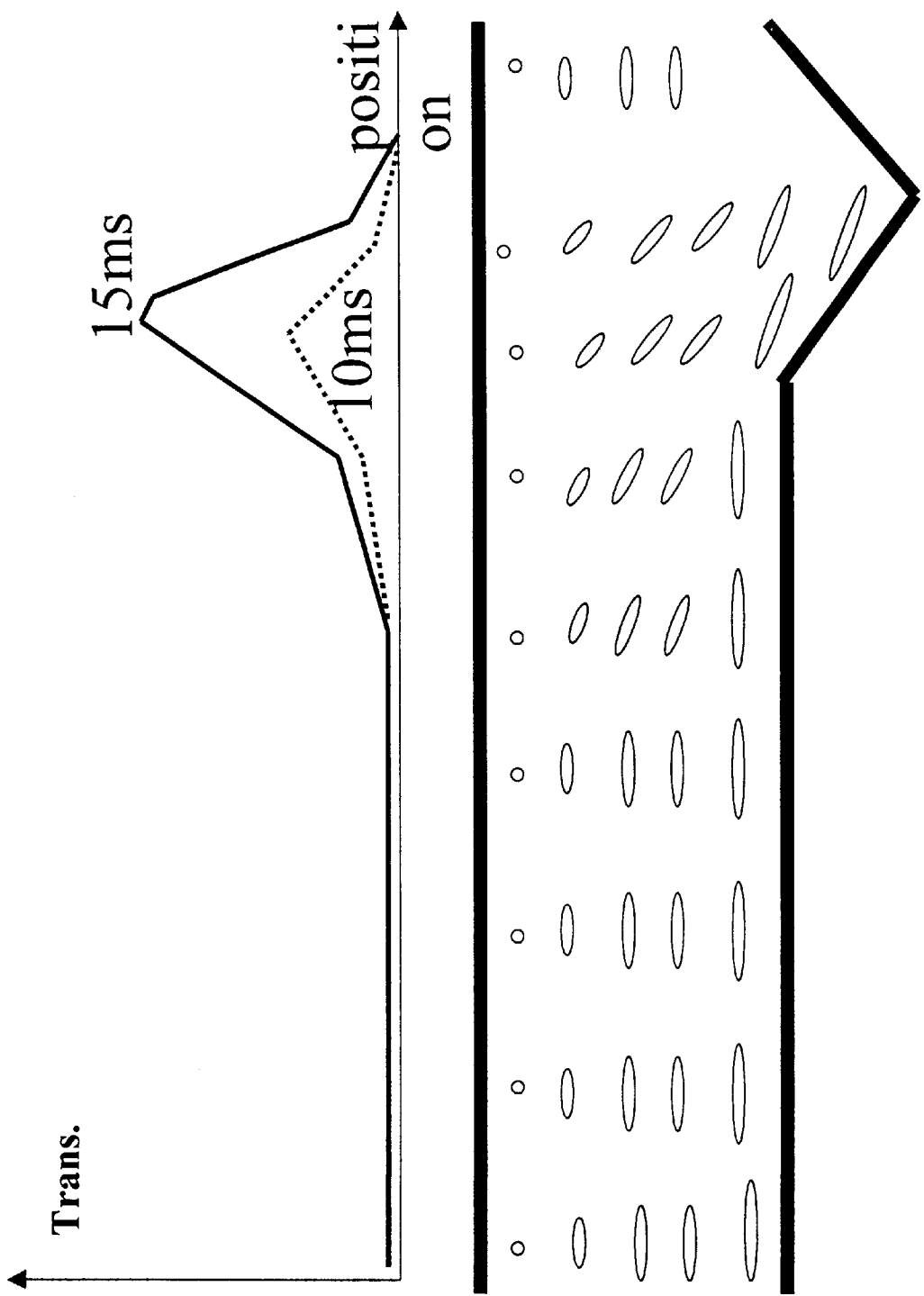
FIG. 8 shows the distribution of liquid crystals in a liquid crystal display according to the invention 15 mini seconds after an electrical voltage of 5 volts is applied to the display.

FIG. 8 shows the distribution of liquid crystals after an electrical voltage of 5 volts is applied to the liquid display for 15 mini seconds. After the driving voltage is applied, the higher is the voltage, the stronger is the pre-tilting of liquid crystals caused by the concave structures. The liquid crystals are aligned from the concave structures outwards. Within 15 mini seconds of applying the 5 volt voltage, the effect of the concave structure can reach liquid crystals more than 100 $\mu$m away.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-domain liquid crystal display comprising:
   a first substrate coated with a passivation layer;
   a pixel electrode layer formed above said passivation layer;
   at least one concave structure formed in each pixel area on said pixel electrode layer, said passivation layer being dented by said concave structure;
   a second substrate with a common electrode layer formed below said second substrate; and
   a liquid crystal layer with liquid crystals filling a space between said pixel and common electrode layers;
   wherein said at least one concave structure has a top void wilt a width ranging from 0.5 $\mu$m to 20 $\mu$m and a depth ranging from 100 to 1000 angstroms.

2. The multi-domain liquid crystal display as claimed in claim 1, wherein at least one opening is formed on one of said pixel and common electrode layers in each pixel area.

3. The multi-domain liquid crystal display as claimed in claim 1, wherein at least one bump structure is formed on one of said pixel and common electrode layers in each pixel area.

4. The multi-domain liquid crystal display as claimed in claim 1, further comprising at least one polarizer attached on an exterior surface of said liquid crystal display.

5. The multi-domain liquid crystal display as claimed in claim 4, further comprising at least a compensation film between said polarizer and one of said pixel and electrode layers.

6. The multi-domain liquid crystal display as claimed in claim 1, further comprising at least an alignment film between said liquid crystal layer and one of said pixel and electrode layers.

7. The multi-domain liquid crystal display as claimed in claim 1, wherein said at least one concave structure has a cross-sectional view with a shape selected from the group of a triangular, a trapezoid, and an arch.

8. The multi-domain liquid crystal display as claimed in claim 1, wherein said at least one concave structure has a three-dimensional top void with a shape in the form of a structure selected from the group of a cone, a wedge, a three-dimensional trapezoid, a pyramid, and an oval shaped cone.

9. The multi-domain liquid crystal display as claimed in claim 1, wherein said at least one concave structure has a top view with a shape selected from the group of a bar, a cross, an X shape, a Y-inverse-Y shape, a T-inverse-T shape and a V-inverse-V shape.

10. The multi-domain liquid crystal display as claimed in claim 1, wherein a side wall of said at least one concave structure has a slope with an angle ranging from 3 to 70 degrees.

11. A multi-domain liquid crystal display comprising:
    a first substrate with a pixel electrode layer formed above said first substrate;
    a second substrate coated with a passivation layer underneath;
    a common electrode layer formed below said passivation layer;
    at least one concave structure formed in each pixel area on said common electrode layer, said passivation layer being dented by said concave structure; and
    a liquid crystal layer with liquid crystals filling a space between said pixel and common electrode layers;
    wherein said at least one concave structure has a top void with a width ranging from 0.5 $\mu$m to 20 $\mu$m and a depth ranging from 100 to 1000 angstroms.

12. The multi-domain liquid crystal display as claimed in claim 11, wherein at least one opening is formed on one of said pixel and common electrode layers in each pixel area.

13. The multi-domain liquid crystal display as claimed in claim 11, wherein at least one bump structure is formed on one of said pixel and common electrode layers in each pixel area.

14. The multi-domain liquid crystal display as claimed in claim 11, further comprising at least one polarizer attached on an exterior surface of said liquid crystal display.

15. The multi-domain liquid crystal display as claimed in claim 14, further comprising at least a compensation film between said polarizer and one of said pixel and electrode layers.

16. The multi-domain liquid crystal display as claimed in claim 11, further comprising at least an alignment film between said liquid crystal layer and one of said pixel and electrode layers.

17. The multi-domain liquid crystal display as claimed in claim 11, wherein said at least one concave structure has a cross-sectional view with a shape selected from the group of a triangular, a trapezoid, and an arch.

18. The multi-domain liquid crystal display as claimed in claim 11, wherein said at least one concave structure has a three-dimensional void with a shape in the form of a structure selected from the group of a cone, a wedge, a three-dimensional trapezoid, a reversed pyramid, and an oval shaped cone.

19. The multi-domain liquid crystal display as claimed in claim 11, wherein said at least one concave structure has a top view with a shape selected from the group of a bar, a cross, an X shape, a Y-inverse-Y shape, a T-inverse-T shape and a V-inverse-V shape.

20. The multi-domain liquid crystal display as claimed in claim 11, wherein a side wall of said at least one concave structure has a slope with an angle ranging from 3 to 70 degrees.

21. A multi-domain liquid crystal display comprising:
   a first substrate coated with a passivation layer;
   a pixel electrode layer formed above said passivation layer;
   at least one concave structure formed in each pixel area on said pixel electrode layer, said passivation layer being dented by said concave structure;
   a second substrate with a common electrode layer formed below said second substrate; and
   a liquid crystal layer with liquid crystals filling a space between said pixel and common electrode layers;
   wherein at least one wall-bump structure is formed on one of said pixel and common electrode layers around the concave structure formed in each pixel area.

22. A multi-domain liquid crystal display comprising:
   a first substrate with a pixel electrode layer formed above said first substrate;
   a second substrate coated with a passivation layer underneath;
   a common electrode layer formed below said passivation layer;
   at least one concave structure formed in each pixel area on said common electrode layer, said passivation layer being dented by said concave structure; and
   a liquid crystal layer with liquid crystals filling a space between said pixel and common electrode layers;
   wherein at least one wall-bump structure is formed on one of said pixel and common electrode layers around the concave structure formed in each pixel area.

* * * * *